Feb. 8, 1944.  W. TRAUPEL  2,341,490
GAS TURBINE PLANT
Filed May 4, 1942
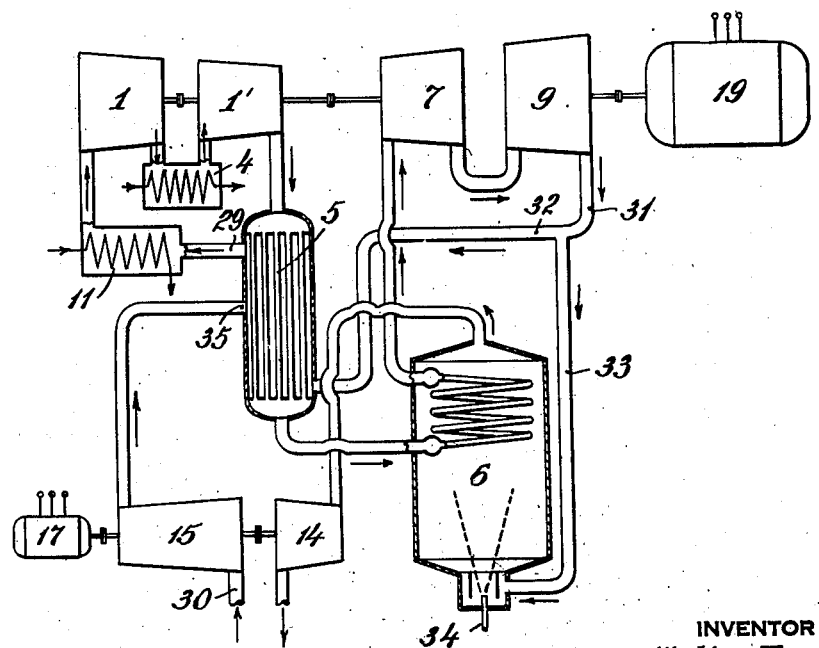
INVENTOR
Walter Traupel
BY
ATTORNEYS Patented Feb. 8, 1944

2,341,490

UNITED STATES PATENT OFFICE 2,341,490

GAS TURBINE PLANT

Walter Traupel, Winterthur, Switzerland, assignor to Sulzer Frères, Société Anonyme, Winterthur, Switzerland Application May 4, 1942, Serial No. 441,599
In Switzerland October 11, 1941

2 Claims. (Cl. 60—41)

The invention relates to a gas turbine plant, in which the working medium is compressed, then heated, and afterwards expanded in at least one turbine developing the useful work, whereby a part of this working medium flows in a closed circuit, whilst another part is taken from the closed circuit and instead of it a replace part is introduced, and whereby the part taken from the closed circuit is further used as combustion air in heating the working medium flowing in the closed circuit. The invention consists in that the charging compressor, which works without intermediate cooling, delivers fresh air direct into the preheater of the plant. The exhaust gases from the air heater are thereby preferably passed into the exhaust gas turbine without the intermediate arrangement of a further heat exchanger. The fresh air can be introduced into the heat exchanger at that part where the air flowing on the low-pressure side of the heat exchanger has at least approximately the same temperature as the fresh air.

The purpose of the invention is to obtain by means of a simple arrangement, a plant with an overall high efficiency.

One example of execution according to the invention is shown diagrammatically in the drawing.

I and I' are the low-pressure and high-pressure parts of the main compressor, 4 is the intermediate cooler, 5 the preheater, and 6 the air heater. 7 and 9 are the high and low-pressure turbines, 11 is the recooler, 14 the exhaust gas turbine. 35 shows the place at which the fresh air is introduced through the piping into the closed circuit. 19 is the driven machine (an electric generator) and 17 the output-balancing machine of the charging set.

The turboblower 15 compresses the working medium which is drawn in through the pipe 30. The compressed air then flows from the turboblower 15 to the place 35, a suitable place in the preheater and then through the pipe 29. The air is cooled in the recooler 11 and enters the main compressor 1 and 1', an intermediate cooler 4 being fitted between the two parts of the main compressor 1 and 1'. The compressed air is led through the preheater 5 and then further heated in the air heater 6.

In the high-pressure turbine 7 the first part of the expansion takes place, in the low-pressure turbine 9 a further part of the expansion. After passing through the low-pressure turbine 9, a part of the air is led into the preheater 5 through the pipes 31, 32. The other part flows through the pipe 33 into the heater 6 into which fuel is injected through the pipe 34. The hot combustion gas thereby produced heats the air flowing through the nest of tubes in the air heater 6, thus becoming cooled; it is then led into the exhaust gas turbine 14 where the gases of combustion are expanded.

The method of working of the plant is in itself known. The balance of output at the charging set 14, 15, can of course also be obtained by other means than by the electric generator 17 shown in the drawing.

I claim:

1. A gas turbine plant which comprises compressor means for compressing a working gas, a preheater, a combustion heater, fuel supply means for the combustion heater, series connected high pressure and low pressure turbines, means for passing the compressed gas from the compressor means to the preheater and then into the combustion heater, a conduit for passing the compressed gas after being heated in the combustion heater through the high pressure and low pressure turbines in series, means for passing a part of the expanded gas from the low pressure turbine to the combustion heater to burn the fuel, a turboblower, an exhaust gas turbine arranged to drive the turboblower, means for passing air compressed by the turboblower to an intermediate part of the preheater, a conduit for passing the combustion gas from the combustion heater directly through the exhaust gas turbine, and a conduit for passing the other part of the gas expanded in the low pressure turbine through the preheater to preheat the compressed gas and then back into the compressor means.

2. A gas turbine plant which comprises a compressor for compressing a working gas, a preheater for passing the compressed gas therethrough, a combustion heater provided with fuel supply means, a high pressure turbine, a low pressure turbine, a conduit for passing the compressed gas from the preheater through the combustion heater and the two turbines in series, a conduit for passing a part of the gas expanded in the low pressure turbine to the combustion heater to burn the fuel, an exhaust gas turbine, a conduit for passing the combustion gas directly from the combustion heater through the exhaust gas turbine to the atmosphere, a conduit for passing a part of the gas expanded in the low pressure turbine through the preheater and back to the compressor, a turboblower driven by the exhaust gas turbine, conduit means for drawing air from the atmosphere into the turboblower and passing the compressed air into the preheater at an intermediate point to intermingle with the gas from the low pressure turbine and then pass into the compressor.

WALTER TRAUPEL.